UNITED STATES PATENT OFFICE.

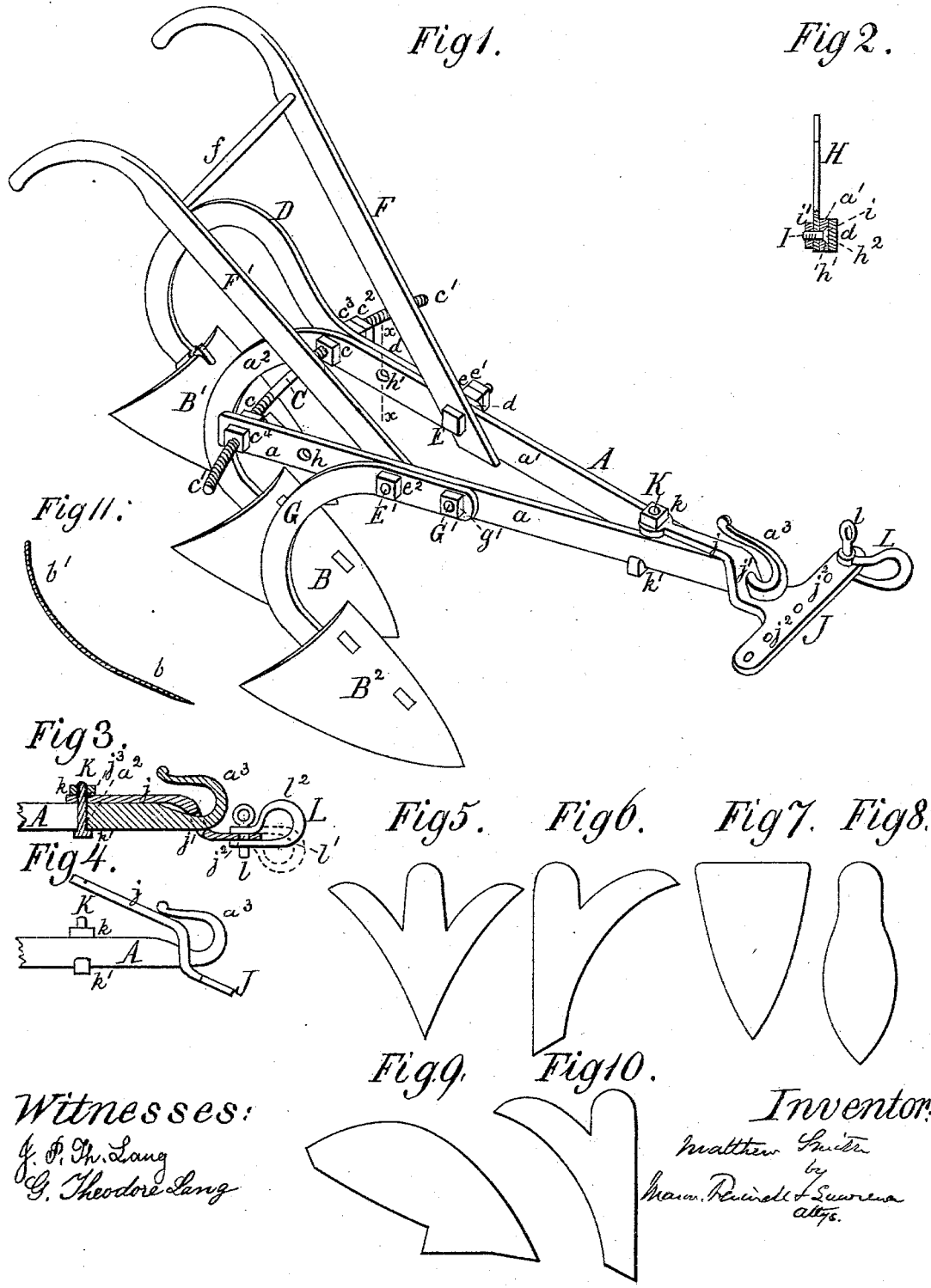

MATTHEW SMITH, OF WAXAHACHIE, TEXAS.

IMPROVEMENT IN CULTIVATORS.

Specification forming part of Letters Patent No. 210,718, dated December 10, 1878; application filed November 6, 1878.

*To all whom it may concern:*

Be it known that I, MATTHEW SMITH, of Waxahachie, in the county of Ellis and State of Texas, have invented a new and useful Improvement in Shovel-Cultivators, which improvement is fully described in the following specification and annexed drawings, in which latter—

Figure 1 is a perspective view of my improved shovel-cultivator. Fig. 2 is a sectional view through the left beam at the point where the fastening of one of the ordinary handle-braces is inserted. The line $x$ $x$ of Fig. 1 indicates where the section is taken. Fig. 3 is a vertical central section of the front part of the cultivator and its clevis attachment as when used with two horses. Fig. 4 is an elevation of the same, showing the clevis released and ready to be removed when a single horse is to be attached to the front hook of the cultivator-beam. Figs. 5, 6, 7, 8, 9, 10 are elevations of shovels of different construction adapted for use upon my cultivator-frame, and to be used as occasion may require. Fig. 11 is a longitudinal section through one of my shovels.

My invention relates especially to an improvement in that description of cultivator which has its beam formed of two branches, united in front in a draft-hook, and having curved shovel-supports at the rear of each branch.

The nature of my invention consists, first, in a novel construction of the expansible cultivator, as will be hereinafter described and specifically claimed.

It consists, second, in an improved removable clevis, with up-and-down adjustment, as hereinafter described.

Heretofore cultivators having a V-shaped main beam and two curved shovel-supports could not be used for marking off land, and therefore a separate plow had to be provided.

To adapt my cultivator to the various uses required I construct it with three shovel-supports, and having the forward and rear ones removable from the main shovel-beam, which is provided with one permanent curved shovel-support and has its other bar or branch made straight at its rear end, and thus I am able to make a single-shovel plow of my cultivator for marking off land without any obstacle being offered by the bar or branch of the beam which is not carrying a shovel.

In covering planted grain two shovels are used, which are laterally in line with and stand farther apart from each other than the three shovels of the ordinary cultivator. I adapt my cultivator for this change by making one of the removable shovel-supports attachable to one of the expansible main cultivator-beams in the proper position for that purpose, and by connecting the flaring parts of the main cultivator-beam with a screw-threaded adjustable brace-bar and jam-nuts.

In cultivating growing plants three shovels are used, and I adapt my cultivator for this purpose by attaching the third shovel-support by the brace-rod and handle-bolt to the curved branch of the cultivator-beam.

In the drawings, A represents a forked cultivator-beam, consisting of two bars, a straight bar, $a$, and a partly-straight bar, $a^1$, united at $a^2$, as seen in Fig. 3. The bar $a^1$ has a curved shovel-support, $a^2$, formed on its rear end, to which a shovel, B, is attached.

The front of the cultivator-beam A is provided with a draft-hook, $a^3$. A curved brace-rod, C, is passed through the bars $a$ $a^1$ near the rear end of the bar $a$, and this rod is screw-threaded at both ends, as seen at $c^1$ in Fig. 1, and provided with nuts $c$ on the inner sides of the bars $a$ $a^1$, for a purpose hereinafter explained.

To the outside of the bar $a^1$, and between the said bar and the outer nut, $c^3$, of the brace C, the straight part $d$ of a curved shovel-support, D, is fastened by means of the clamping-nuts $c^3$ of the bar $a^1$, and brace C, and a jam-nut, $c^2$, and a bolt, E, with nut $e$ and jam-nut $e^1$. To the shovel-support D a shovel, $B^1$, is attached. The bolt E serves, also, to fasten a handle, F, to the inner side of the bar $a^1$, the lower end of said handle being inserted between the head of the bolt E and the bar $a^1$. The other handle, F′, is fastened, by means of a bolt, E′, and nut $e^2$, to the bar $a$, and the two handles F F′ are united by a brace-rod, $f$, by which the handles are kept steady, and which is sufficiently yielding to allow the handles to accommodate themselves to the different adjustments of the bars $a$ $a^1$ upon the rod C.

A curved shovel-support, G, with a shovel,

B², attached to it, is fastened to the outside of the bar $a$ by means of the handle-fastening bolt E' and nut $e^2$, above referred to, and by a bolt, G', and nut $g'$, as shown.

The bolt E' may, like the bolt E, and for a similar purpose, be supplied with a jam-nut.

I have provided the bars $a$ $a^1$ with holes $h$ $h'$, for the purpose of furnishing the handles with diagonal braces H, of ordinary construction, Fig. 2.

The hole $h'$ is countersunk at the outside of the bar $a^1$, and a bolt, I, is inserted with a corresponding head, $i$, for the purpose of fastening the left handle-brace with a nut, $i'$, as shown, and this leaves the outer surface of the bar $a^1$ flush and adapted to have the shovel-support D rigidly attached to it.

The upper end of the brace H is fastened to the handle, as usual, with an ordinary screw-bolt.

The shape and set of the ordinary shovel-supports D G are such that the shovels B¹ B², which are attached to them, are held at the requisite distances from the middle shovel, B.

The front part of the shovel-beam A is provided with a clevis, J L, J being a transverse horizontal plate having a goose-neck-shaped shank, $j$, the end part of which has a hole, $j^3$, and is fastened to the bar A, at its union $a^2$, by means of a T-shaped bolt, K, and a nut, $k$.

The incline part or goose-neck of the shank $j$ has a hole, $j^1$, through which the hook $a^3$ of the shovel-beam A passes. The clevis-plate J is, in consequence, depressed below the hook $a^3$, and thereby the line of draft is thrown lower down than the beam, and the shovels B B¹ B² are caused to enter to a less depth into the ground.

The head $k'$ of the bolt K clasps the bars $a$ $a^1$ from below, and is thereby prevented from turning when the nut $k$ is turned.

The clevis-plate J is provided with adjusting-holes $j^2$ and a reversible clevis-hook, L, the two ends of which latter are attached by means of a pin, $l$, which passes through them and one of the holes $j^2$, and thus the clevis-hook may be set in any of the holes $j^2$ in order to adjust the draft of the cultivator in a lateral direction.

The clevis-hook L is of eccentric shape, straight on one side, as at $l^1$, and circular on the opposite side, as at $l^2$, in Fig. 3, and thus when the circular side is turned up, as is represented in full lines, the point of attachment for the draft is thrown higher than when the clevis-hook is turned down, as represented by dotted lines.

The hole $j^1$ in the inclined part of the shank $j$ serves to permit the slipping of the shank over the hook $a^3$ of the forked beam and to hold the front part of the clevis in position without the aid of another screw-bolt. By this means of applying the clevis, lateral strain on the back bolt K is prevented, as the hook $a^3$ fits snugly in the hole $j^1$.

In order to withdraw the clevis from the hook $a^3$ the bolt K is loosened by removing the nut $k$, and the shank $j$, with the plate J, is turned up until it can be moved sidewise and slipped over the hook transversely. This operation is reversed when the clevis is to be attached to the plow.

This clevis is used when the cultivator is drawn by two horses, and is removed when one horse is employed.

For the purpose of planting and "covering in" grain, two shovels are used, and the cultivator is adjusted for this work by first removing the shovel-supports D G, then removing the outer nut, $c^4$, from the bar C, then setting the shovel-support G back toward the end of the bar $a$, by passing it by means of its rear bolt-hole over the bar C, and fastening it with the outer nut, $c^4$, and finally inserting the bolt G' in the hole $h$ of the bar $a$ and in the front hole of the shovel-support G, and fastening it with the nut $g'$. By this adjustment the shovel B² is made to stand abreast with the shovel B; but the two shovels thus working together must be set at a greater distance apart in order to adapt them for the work above referred to, and this is effected by springing the rear portions of the bars $a$ $a^1$ farther apart; and for accomplishing this the outer nuts, $c^2$ $c^3$ $c^4$, are screwed back the requisite distance, and the inner nuts, $c$, screwed up tight against the bars $a$ $a^1$ until they abut against the outer nuts, $c^3$ $c^4$.

By removing both of the shovel-supports D G the middle shovel, B, only remains, and in this condition the cultivator is used for marking off land. The bars $a$ $a^1$ are then set as near together as possible in order to centralize the weight of the frame.

Cultivators with V-shaped expansible bearings and curved shovel-supports constructed in one piece are not adapted for marking off land; for if one shovel should be removed its support would still remain as an obstruction in passing over stumpy and roughly-plowed land, and would seriously interfere with the marking off with the single shovel.

The longitudinal section, Fig. 11, illustrates the shape of the shovels employed with my cultivator, the front part being straight, as at $b$, and the rear part curved with a gradual increase of curvature toward the upper end, as at $b'$. This construction greatly facilitates the lifting of the soil, prevents its working up upon the shovel-support, and causes the soil to leave the shovel in a freer and looser condition than other constructions heretofore adopted.

Having thus described my invention, what I claim as new, and desire to secure by Letters Patent, is—

1. A cultivator having a forked expansible beam, A, one branch, $a^1$, of which is terminated with a curved shovel-support, $a^2$, and the other branch, $a$, made straight and without a shovel-support, and adapted to have a removable shovel-support, G, attached to it, either forward of or abreast with the curved permanent shovel-support $a^2$, substantially as and for the purpose set forth.

2. In combination with a cultivator, A, having a draft-hook, $a^3$, the goose-neck clevis-plate J, having apertures $j^1 j^3$, whereby it can be slipped upon the beam and confined to it by a single bolt, substantially as and for the purpose set forth.

3. The combination of the adjusting clevis-plate J, reversible eccentric clevis-hook L, and hook $a^3$ of the cultivator-beam, substantially as and for the purpose set forth.

4. The draft-adjusting clevis-plate J, having its shank $j$ of goose-neck shape, provided with apertures $j^1 j^3$, in combination with the hooked end of the V-shaped beam A, the two branches $a\ a^1$ of the beam, and the T-bolt fastening K, substantially as set forth.

Witness my hand in matter of my application for a patent for improvement in shovel-cultivators.

MATTHEW SMITH.

In presence of—
I. H. WITHERSPOON,
ANDREW WERNER.